(12) United States Patent
Schmidt

(10) Patent No.: US 7,684,807 B2
(45) Date of Patent: *Mar. 23, 2010

(54) CELLULAR CHANNEL BONDING FOR IMPROVED DATA TRANSMISSION BANDWIDTH

(76) Inventor: Dominik J. Schmidt, 580 Arastradero Rd., Palo Alto, CA (US) 94306

( * ) Notice: Subject to any disclaimer, the term of this patent is extended or adjusted under 35 U.S.C. 154(b) by 690 days.

This patent is subject to a terminal disclaimer.

(21) Appl. No.: 11/331,787

(22) Filed: Jan. 13, 2006

(65) Prior Publication Data

US 2006/0176861 A1 Aug. 10, 2006

Related U.S. Application Data

(63) Continuation of application No. 09/887,906, filed on Jun. 22, 2001, now Pat. No. 7,020,472.

(51) Int. Cl.
H04W 72/00 (2009.01)
(52) U.S. Cl. .............. 455/450; 455/452.1; 455/41.2; 370/329
(58) Field of Classification Search .......... 370/329, 370/226, 315, 331, 335, 337, 310, 322, 336, 370/341, 348; 455/450, 451, 452.1, 452.2, 455/453, 41.2, 552.1, 550.1, 553.1
See application file for complete search history.

(56) References Cited

U.S. PATENT DOCUMENTS

| 4,977,612 | A  | 12/1990 | Wilson |
| 5,625,877 | A  | 4/1997  | Dunn et al. ............... 455/454 |
| 5,625,889 | A  | 4/1997  | Chikkaswamy et al. |
| 5,655,217 | A  | 8/1997  | Lemson |
| 5,752,193 | A  | 5/1998  | Scholefield et al. |
| 5,805,982 | A  | 9/1998  | Hulsebosch |
| 5,960,354 | A  | 9/1999  | Einola ..................... 455/454 |
| 6,081,168 | A  | 6/2000  | Park ......................... 331/179 |
| 6,282,433 | B1 | 8/2001  | Holshouser |
| 6,374,112 | B1 | 4/2002  | Widegren et al. ........ 455/452.2 |
| 6,377,608 | B1 | 4/2002  | Zyren ....................... 375/132 |
| 6,430,395 | B2 | 8/2002  | Arazi et al. ............... 455/41.2 |
| 6,452,910 | B1 | 9/2002  | Vij et al. .................. 370/310 |
| 6,526,034 | B1 | 2/2003  | Gorsuch |
| 6,563,910 | B2 | 5/2003  | Menard et al. ............. 379/45 |
| 6,597,672 | B1 | 7/2003  | Gustafsson et al. |
| 6,600,726 | B1 | 7/2003  | Nevo et al. ................ 370/278 |
| 6,650,871 | B1 | 11/2003 | Cannon et al. |
| 6,742,052 | B2 | 5/2004  | Himmel et al. |
| 6,745,018 | B1 | 6/2004  | Zehavi et al. ............. 455/296 |
| 6,826,387 | B1 | 11/2004 | Kammer ................... 455/41.2 |

(Continued)

OTHER PUBLICATIONS

Sahula et al., Design Planning for Single Chip Implementation of Digital Wireless Mobile Transceiver, 2000 IEEE International Conference on Personal Wireless Communications. Conference Proceedings, IEEE, Piscataway, NJ, p. 19-23.

(Continued)

*Primary Examiner*—Jean A Gelin

(57) ABSTRACT

Systems and methods wirelessly communicate data over a plurality of cellular channels by requesting an allocation of cellular frequency channels from a mobile station to a base station; allocating available frequency channels in response to the request from the mobile station; and bonding the available frequency channels to communicate data.

20 Claims, 5 Drawing Sheets

U.S. PATENT DOCUMENTS

| | | | |
|---|---|---|---|
| 7,242,938 B2 | 7/2007 | Kobylinski et al. | |
| 2001/0010689 A1 | 8/2001 | Awater et al. | 370/344 |
| 2002/0019698 A1 | 2/2002 | Vilppula et al. | |
| 2002/0028655 A1 | 3/2002 | Rosener et al. | 455/16 |
| 2002/0068570 A1 | 6/2002 | Abrol et al. | 455/438 |
| 2002/0128037 A1 | 9/2002 | Schmidt | 455/553.1 |
| 2002/0197998 A1 | 12/2002 | Schmidt | |
| 2003/0035388 A1 | 2/2003 | Schmidt | 370/329 |
| 2003/0058830 A1 | 3/2003 | Schmidt | 370/347 |
| 2005/0157677 A1 | 7/2005 | Dowling | |

OTHER PUBLICATIONS

Parssinen et.al., "A Wide-Band Direct Conversion Receiver with On-Chip A/D Converters," 2000 Symposium on VLSI Circuits Digest of Technical Papers, IEEE, Piscataway, NJ, p. 32-33.

Jin et al., "A 1-V, 1.9-GHz CDMA, CMOS on SOI, Low Noise Amplifier," 2000 IEEE International SOI Conference Proceedings, IEEE, Piscataway, NJ, p. 102-103.

Singh, "Mixed-Signal Data Conversion Chip for Wireless Communication Systems," WCNC. 1999 Wireless Communications and Networking Conference, IEEE, New Orleans, LA, p. 737-741.

Rael et.al., "Design Methodology Used in a Single-Chip CMOS 900 MHz Spread-Spectrum Wireless Transceiver," Proceedings 1998 Design and Automation Conference; IEEE; New York, NY; p. 44-49.

Megahed et.al., "UTSi(R) CMOS Technology for System-on-Chip Solution," 1998 Topical Meeting on Silicon Monolithic Integrated Circuits in RF Systems Digest of Papers, IEEE, Piscataway, NJ, p. 94-99.

Kostic et al., "Digital Signal Processors in Cellular Radio Communications," Dec. 1997, IEEE Communications Magazine, p. 22-35.

Official action of Apr. 8, 2005 in U.S. Appl. No. 09/930,827, 14 pages.

Response to Official Action of Apr. 8, 2005 in U.S. Appl. No. 09/930,827, 14 pages filed Aug. 2, 2005.

Official Letter of Jan. 30, 2006 in U.S. Appl. No. 09/930,827, 17 pages.

Response to Official Action of Jan. 30, 2006 in U.S. Appl. No. 09/930,827, 6 pages filed Mar. 23, 2006.

Advisory Action of Apr. 12, 2006 in U.S. Appl. No. 09/930,827, 3 pages.

Pre-Brief Conference Request of Apr. 27, 2006 in U.S. Appl. No. 09/930,827, 5 pages.

Official Action of Sep. 7, 2006 in U.S. Appl. No. 09/930,827, 10 pages.

Response to Official Action of Sep. 7, 2006 in U.S. Appl. No. 09/930,827, 7 pages, filed Dec. 5, 2006.

Official Action of Feb. 27, 2007 in U.S. Appl. No. 09/930,827, 13 pages.

Response to Official Action of Feb. 27, 2007 in U.S. Appl. No. 09/930,827, 5 pages, filed Apr. 13, 2007.

Advisory Action of May 15, 2007 in U.S. Appl. No. 09/930,827, 3 pages.

Pre-Brief Conference Request of May 24, 2007 in U.S. Appl. No. 09/930,827, 4 pages.

Official Action of Dec. 5, 2007 in U.S. Appl. No. 09/930,827, 13 pages.

Response to Official Action of Dec. 5, 2007 in U.S. Appl. No. 09/930,827, 10 pages, filed Mar. 4, 2008.

Official Action of Jun. 13, 2008 in U.S. Appl. No. 09/930,827, 20 pages.

Response to Official Action of Jun. 13, 2008 in U.S. Appl. No. 09/930,827, 5 pages, filed Jul. 18, 2008.

Advisory Action of Aug. 15, 2008 in U.S. Appl. No. 09/930,827, 5 pages.

Response to Official Action of Jun. 13, 2008 in U.S. Appl. No. 09/930,827, 8 pages, filed Sep. 15, 2008.

Official Action of Oct. 1, 2008 in U.S. Appl. No. 09/930,827, 21 pages.

CELLULAR CHANNEL BONDING FOR IMPROVED DATA TRANSMISSION BANDWIDTH

This application is a continuation of U.S. patent application Ser. No. 09/887,906 filed Jun. 22, 2001 now U.S. Pat. No. 7,020,472 entitled "Cellular Channel Bonding For Improved Data Transmission," the content of which is hereby incorporated by reference.

BACKGROUND

The present application relates to bonded channels for increasing wireless transmission bandwidth.

The impressive growth of cellular mobile telephony as well as the number of Internet users promises an exciting potential for cellular wireless data services. As demonstrated by the popularity of the Palm V wireless handheld computer, the demand for wireless data services, and particularly for high-performance wireless Internet access, is growing rapidly. However, the price/performance curve for existing cellular data services can still be enhanced. One reason for the current price/performance curve stems from the fact that current wireless data services are based on circuit switched radio transmission. At the air interface, a complete traffic channel is allocated for a single user for the entire call period, which can be inefficient for bursty traffic such as Internet traffic. For bursty Internet traffic, packet switched bearer services result in better utilization of the traffic channels because a channel will only be allocated when needed and will be released immediately after the transmission of the packets. With this principle, multiple users can share one physical channel (statistical multiplexing).

In order to address these inefficiencies, two cellular packet data technologies have been developed: cellular digital packet data (CDPD) (for AMPS, IS-95, and IS-136) and the General Packet Radio Service (GPRS). GPRS is a bearer service for GSM that improves and simplifies wireless access to packet data networks. GPRS applies a packet radio principle where packets can be directly routed from the GPRS mobile stations to packet switched networks. In a GSM/GPRS network, conventional circuit switched services (speech, data, and SMS) and GPRS services can be used in parallel: a class A mobile station supports simultaneous operation of GPRS and conventional GSM services; a class B mobile station is able to register with the network for both GPRS and conventional GSM services simultaneously, but can use only one service at a time; and a class C mobile station can attach for either GPRS or conventional GSM services, but cannot simultaneously register and use the services. GPRS improves the utilization of the radio resources, offers volume-based billing, higher transfer rates, shorter access times, and simplifies the access to packet data networks.

One evolution of GPRS is called EDGE (Enhanced Data for Global Evolution). EDGE uses 8 PSK modulation that automatically adapts to local radio conditions, offering the fastest transfer rates near to base stations in good conditions. It offers up to 48 kbps per channel, compared to 14 kbps per channel with GPRS and 9.6 kbps per channel for GSM. By allowing simultaneous use of multiple channels, EDGE allows rates of 384 kbps using all eight GSM channels. However, even the improved data transfer rate in GPRS is insufficient for certain applications, for example data visualization, real-time imaging, video on demand, video streaming, video conferencing, and other multimedia applications.

SUMMARY

In one aspect, a method to wirelessly communicate data over a plurality of cellular channels includes requesting an allocation of cellular frequency channels from a mobile station to a base station; allocating available frequency channels in response to the request from the mobile station; and bonding the available frequency channels to communicate data.

Implementations of the above aspect may include one or more of the following. The method includes communicating on a short-range radio channel, wherein the short-range radio channel is Bluetooth or IEEE 802.11 (also known as Wireless Local Area Network or WLAN). The method can bond the short-range radio channel along with several cellular frequency channels to increase bandwidth. The cellular channels can consist of an uplink band around 890-915 MHz and a downlink band around 935-960 MHz. The method can bond two adjacent channels. Each band can be divided into 124 pairs of frequency duplex channels with 200 kHz carrier spacing using Frequency Division Multiple Access (FDMA). Another method, Time Division Multiple Access (TDMA) can split the 200 kHz radio channel into a plurality of time slots; bonding the time slots; and transmitting and receiving data in the bonded time slots. Cellular packet data can be transmitted in accordance with the following protocols: cellular digital packet data (CDPD) (for AMPS, IS-95, and IS-136), General Packet Radio Service (GPRS) and EDGE (Enhanced Data for Global Evolution).

In another aspect, a reconfigurable processor core includes one or more processing units; a long-range transceiver unit coupled to the processing units, the long-range transceiver unit communicating over a plurality of cellular frequency channels; a short-range transceiver coupled to the processing units; and means for bonding a plurality of wireless channels.

Implementations of the above aspect may include one or more of the following elements to perform the necessary computations and electronic operations. A reconfigurable processor core includes one or more digital signal processors (DSPs) and/or one or more reduced instruction set computer (RISC) processors. A router can be coupled to the one or more processing units. The short-range transceiver communicates over a short-range radio channel with a means for bonding the short-range radio channel with the cellular frequency channels to increase bandwidth. The cellular channels comprise an uplink band around 890-915 MHz and a downlink band around 935-960 MHz. A means for bonding over two adjacent cellular channels can be provided to increase the bandwidth of the channels.

Advantages of the system may include one or more of the following. The system allows an end-user of a mobile device, such as a mobile phone or portable computer, to increase the bandwidth of available radio channels on demand for transmitting messages and information quickly over wireless channels. This is achieved by aggregating available wireless channels to increase the overall bandwidth for which a message is transmitted between a mobile handset and a base station so that content rich messages such as multimedia and video files may be transmitted quickly. Additionally, the user can decide when to scale the bandwidth: the user can elect to pay more to get the benefits of bonded channels, or can elect to pay the conventional air-time cost for applications that do not need immediate large bandwidth.

Other advantages may include the following. The system transmits data at high effective data rates and that alleviates latencies concomitant with the time domain data overlay systems. By providing a data communication structure in which temporarily unused wireless channels may be pooled to increase the data transmission rates, the system can transmit data at the same time that voice is being transmitted, without overloading the system. If a wireless local area network (WLAN) is not available in a given area, a number of cellular channels are bonded to increase transmission capacity.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION

Figure 1A:
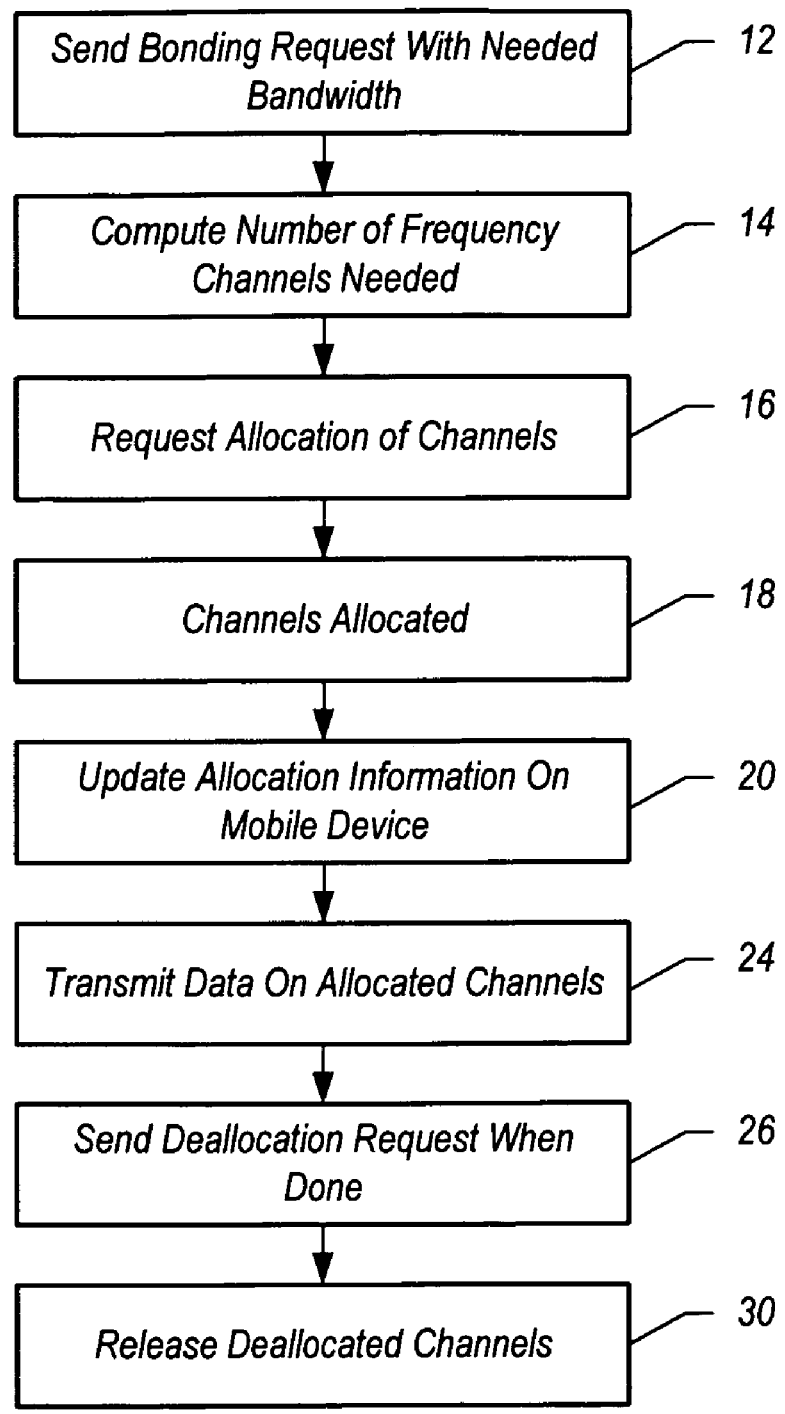
FIG. 1A shows a process 10 to wirelessly communicate data over a plurality of cellular channels.

FIG. 1A shows a process 10 to wirelessly communicate data over a plurality of cellular channels. The process 10 allows a single mobile station to transmit on multiple cellular frequency channels that have been "bonded" or linked together for the purpose of the transmission. Each channel contains one or more frames, and a single mobile station can transmit on multiple time slots of the same TDMA frame (multislot operation). This results in a very flexible channel allocation: one to one hundred twenty four (124) frequency channels (or one to 62 channels for 200 kHz channel spacing interleaved systems), with one to eight time slots per TDMA frame can be allocated for one mobile station. Moreover, uplink and downlink are allocated separately, which efficiently supports asymmetric data traffic (e.g., Web browsing).

First, the process 10 decides whether the added costs of bonding channels are justifiable and if so, sends a bonding request and communicates a required data transmission bandwidth (step 12). Based on the size of the file(s) to be transmitted and known channel bandwidth, the process 10 computes the number of frequency channels that are needed (step 14). Next, the process 10 requests an allocation of cellular frequency channels from a mobile station to a base station (step 16). In response, the base station looks up available (open) frequency channels in its memory storage and allocates available frequency channels in response to the request from the mobile station (step 18). Information on the allocated channels is sent to the mobile station to set up its transceiver to capture data on all allocated channels (step 20). The information can include a list with channel identification or channel frequency, or alternatively can include a starting channel and channel spacing, or can include a starting channel and frequency hopping information, for example.

Once the mobile station sends an acknowledgement that it has set up its RF circuitry to receive data over a plurality of frequency channels, the base station can transmit data over the plurality of frequency channels (step 24). In this manner, the allocated frequency channels are bonded together to communicate data with high bandwidth. Upon conclusion of data transmission, or alternatively when the user decides to get out of the bonded channel mode due to cost or other reasons, the mobile station sends a deallocation request to the base station (step 26), and the base station in turn releases the deallocated channels for other transmissions or for supporting additional users (step 30).

Figure 1B:
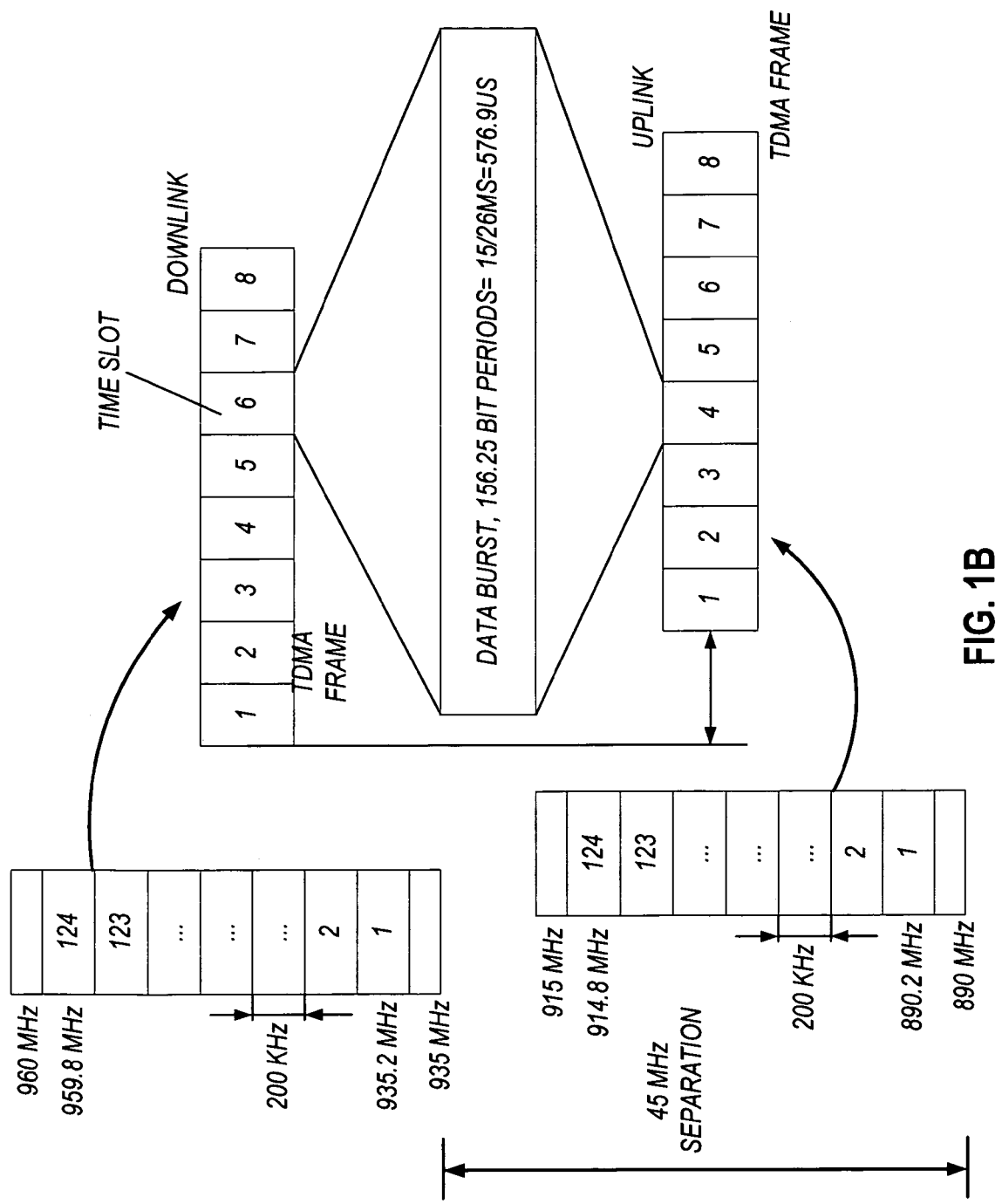
FIG. 1B further illustrates exemplary data transmission using bonded channels.

FIG. 1B further illustrates exemplary data transmission using bonded channels. In the embodiment of FIG. 1B, the mobile station contains one transmitter/receiver pair that transmits on an uplink band around 890 915 MHz for the uplink (direction from mobile station to base station) and receives on a downlink band around 935 960 MHz for the downlink (direction from base station to mobile station). The 25 MHz bands are then divided into 124 pairs of frequency duplex channels with 200 kHz carrier spacing using Frequency Division Multiple Access (FDMA). A cell can use two adjacent channels, and the channel spacing can be said to be 200 kHz interleaved. TDMA is used to split the 200 kHz radio channel into 8 time slots (which creates 8 logical channels). A logical channel is therefore defined by its frequency and the TDMA frame time slot number.

In one exemplary sequence in the embodiment of FIG. 1A, the mobile station requests two channels, and in this example, channels 1 and 2 in FIG. 1B at 890.2 MHz and 890.4 MHz are available. The base station responds by sending the 890.2 and 890.4 MHz frequency identification to the mobile station. The mobile station in turn updates its transceiver with the frequency information, and the transceiver can listen for data in all frames associated with the 890.2 and 890.4 MHz channels. In this example, two frequency channels have been bonded together to increase transmission bandwidth.

Although the above example illustrates a static allocation, the allocation of channels can be performed dynamically, depending on the current traffic load, the priority of the service, and the multi-slot class. A load supervision procedure monitors the transmission load in each cell. According to the current demand, the number of channels can be changed. Channels not currently in use by conventional GSM/GPRS/EDGE can be allocated to increase the quality of service. When there is a resource demand for services with higher priority, channels can be de-allocated. Hence, channels are only allocated when data packets are sent or received, and they are released after the transmission. For bursty traffic this results in an efficient usage of wireless resources and multiple users can share a group of channels to obtain the necessary bandwidth.

Figure 2A:
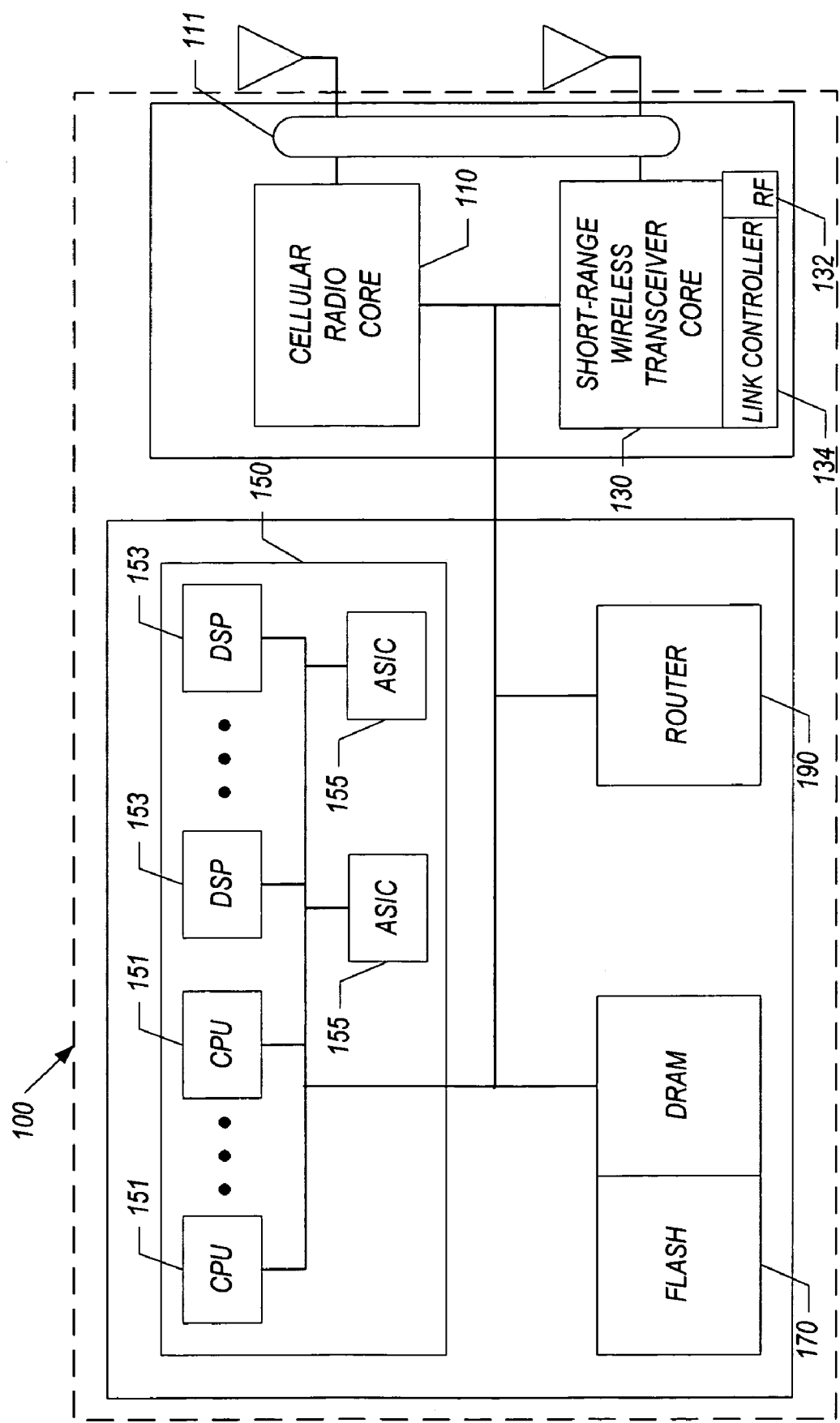
FIG. 2A shows a block diagram of a multi-mode wireless communicator device fabricated on a single silicon integrated chip.

FIG. 2A shows a block diagram of a multi-mode wireless communicator device 100 fabricated on a single silicon integrated chip. In one implementation, the device 100 is an integrated CMOS device with radio frequency (RF) circuits, including a cellular radio core 110, a short-range wireless transceiver core 130, and a sniffer 111, along side digital circuits, including a reconfigurable processor core 150, a high-density memory array core 170, and a router 190. The high-density memory array core 170 can include various memory technologies such as flash memory and dynamic random access memory (DRAM), among others, on different portions of the memory array core.

The reconfigurable processor core 150 can include one or more processors 151 such as MIPS processors and/or one or more digital signal processor (DSPs) 153, among others. The reconfigurable processor core 150 has a bank of efficient processors 151 and a bank of DSPs 153 with embedded functions. These processors 151 and 153 can be configured to operate optimally on specific problems and can include buffers on the receiving end and buffers on the transmitting end.

For example, the bank of DSPs 153 can be optimized to handle discrete cosine transforms (DCTs) or Viterbi encodings, among others. Additionally, dedicated hardware 155 can be provided to handle specific algorithms in silicon more efficiently than programmable processors 151 and 153. The number of active processors is controlled depending on the application, so that power is not used when it is not needed. This embodiment does not rely on complex clock control methods to conserve power, since the individual clocks are not run at high speed, but rather the unused processor is simply turned off when not needed.

Through the router 190, the multi-mode wireless communicator device 100 can detect and communicate with any wireless system it encounters at a given frequency. The router 190 performs the switch in real time through an engine that keeps track of the addresses of where the packets are going. The router 190 can send packets in parallel through two or more separate pathways. For example, if a Bluetooth™ or WLAN connection is established, the router 190 knows which address it is looking at and will be able to immediately route packets using another connection standard. In doing this operation, the router 190 working with the RF sniffer 111 periodically scans its radio environment ('ping') to decide on optimal transmission medium. The router 190 can send some packets in parallel through both the primary and secondary communication channel to make sure some of the packets arrive at their destinations.

The reconfigurable processor core 150 controls the cellular radio core 110 and the short-range wireless transceiver core 130 to provide a seamless dual-mode network integrated circuit that operates with a plurality of distinct and unrelated communications standards and protocols such as Global System for Mobile Communications (GSM), General Packet Radio Service (GPRS), Enhance Data Rates for GSM Evolution (Edge) and Bluetooth™ or WLAN. The cell phone core 110 provides wide area network (WAN) access, while the short-range wireless transceiver core 130 supports local area network (LAN) access. The reconfigurable processor core 150 has embedded read-only-memory (ROM) containing software such as IEEE802.11, GSM, GPRS, Edge, and/or Bluetooth™ or WLAN protocol software, among others.

In one embodiment, the cellular radio core 110 includes a transmitter/receiver section that is connected to an off-chip antenna (not shown). The transmitter/receiver section is a direct conversion radio that includes an I/Q demodulator, transmit/receive oscillator/clock generator, multi-band power amplifier (PA) and PA control circuit, and voltage-controlled oscillators and synthesizers. In another embodiment of transmitter/receiver section, intermediate frequency (IF) stages are used. In this embodiment, during cellular reception, the transmitter/receiver section converts received signals into a first intermediate frequency (IF) by mixing the received signals with a synthesized local oscillator frequency and then translates the first IF signal to a second IF signal. The second IF signal is hard-limited and processed to extract an RSSI signal proportional to the logarithm of the amplitude of the second IF signal. The hard-limited IF signal is processed to extract numerical values related to the instantaneous signal phase, which are then combined with the RSSI signal.

For voice reception, the combined signals are processed by the processor core 150 to form PCM voice samples that are subsequently converted into an analog signal and provided to an external speaker or earphone. For data reception, the processor simply transfers the data over an input/output (I/O) port. During voice transmission, an off-chip microphone captures analog voice signals, digitizes the signal, and provides the digitized signal to the processor core 150. The processor core 150 codes the signal and reduces the bit-rate for transmission. The processor core 150 converts the reduced bit-rate signals to modulated signals such as I,I,Q,Q modulating signals, for example. During data transmission, the data is modulated and the modulated signals are then fed to the cellular telephone transmitter of the transmitter/receiver section.

Turning now to the short-range wireless transceiver core 130, the short-range wireless transceiver core 130 contains a radio frequency (RF) modem core 132 that communicates with a link controller core 134. The processor core 150 controls the link controller core 134. In one embodiment, the RF modem core 132 has a direct-conversion radio architecture with integrated VCO and frequency synthesizer. The RF-unit 132 includes an RF receiver connected to an analog-digital converter (ADC), which in turn is connected to a modem performing digital modulation, channel filtering, AFC, symbol timing recovery, and bit slicing operations. For transmission, the modem is connected to a digital to analog converter (DAC) that in turn drives an RF transmitter.

The link controller core 134 provides link control function and can be implemented in hardware or in firmware. One embodiment of the core 134 is compliant with the Bluetooth™ or WLAN specification and processes Bluetooth™ or WLAN packet types. For header creation, the link controller core 134 performs a header error check, scrambles the header to randomize the data and to minimize DC bias, and performs forward error correction (FEC) encoding to reduce the chances of getting corrupted information. The payload is passed through a cyclic redundancy check (CRC), encrypted/scrambled and FEC-encoded. The FEC encoded data is then inserted into the header.

In one exemplary operating sequence, a user is in his or her office and browses a web site on a portable computer through a wired local area network cable such as an Ethernet cable. Then the user walks to a nearby cubicle. As the user disconnects, the device 100 initiates a short-range connection using a Bluetooth™ or WLAN connection. When the user drives from his or her office to an off-site meeting, the Bluetooth™ or WLAN connection is replaced with cellular telephone connection. Thus, the device 100 enables easy synchronization and mobility during a cordless connection, and open up possibilities for establishing quick, temporary (ad-hoc) connections with colleagues, friends, or office networks. Appliances using the device 100 are easy to use since they can be set to automatically find and contact each other when within range.

When the multi-mode wireless communicator device 100 is in the cellular telephone connection mode, the short-range wireless transceiver core 130 is powered down to save power. Unused sections of the chip are also powered down to save power. Many other battery-power saving features are incorporated, and in particular, the cellular radio core 110 when in the standby mode can be powered down for most of the time and only wake up at predetermined instances to read messages transmitted by cellular telephone base stations in the radio's allocated paging time slot.

When the user arrives at the destination, according to one implementation, the cellular radio core 110 uses idle time between its waking periods to activate the short-range wireless transceiver core 130 to search for a Bluetooth™ or WLAN channel signal. If Bluetooth™ or WLAN signals are detected, the phone sends a deregistration message to the cellular system and/or a registration message to the Bluetooth™ or WLAN system. Upon deregistration from the cellular system, the cellular radio core 110 is turned off or put into a deep sleep mode with periodic pinging and the short-range wireless transceiver core 130 and relevant parts of the synthesizer are powered up to listen to the Bluetooth™ or WLAN channel.

According to one implementation, when the short-range wireless core 130 in the idle mode detects that Bluetooth™ or WLAN signals have dropped in strength, the device 100 activates the cellular radio core 110 to establish a cellular link, using information from the latest periodic ping. If a cellular connection is established and Bluetooth™ or WLAN signals are weak, the device 100 sends a deregistration message to the Bluetooth™ or WLAN system and/or a registration message to the cellular system. Upon registration from the cellular system, the short-range transceiver core 130 is turned off or put into a deep sleep mode and the cellular radio core 110 and relevant parts of the synthesizer are powered up to listen to the cellular channel.

The router 190 can send packets in parallel through the separate pathways of cellular or Bluetooth™ or WLAN. For example, if a Bluetooth™ or WLAN connection is established, the router 190 knows which address it is looking at and will be able to immediately route packets using another connection standard. In doing this operation, the router 190 pings its environment to decide on optimal transmission medium. If the signal reception is poor for both pathways, the router 190 can send some packets in parallel through both the primary and secondary communication channel (cellular and/or Bluetooth™ or WLAN) to make sure some of the packets arrive at their destinations. However, if the signal strength is adequate, the router 190 prefers the Bluetooth™ or WLAN mode to minimize the number of subscribers using the capacity-limited and more expensive cellular system at any give time. Only a small percentage of the device 100, those that are temporarily outside the Bluetooth or WLAN coverage, represents a potential load on the capacity of the cellular system, so that the number of mobile users can be many times greater than the capacity of the cellular system alone could support.

Figure 2B:
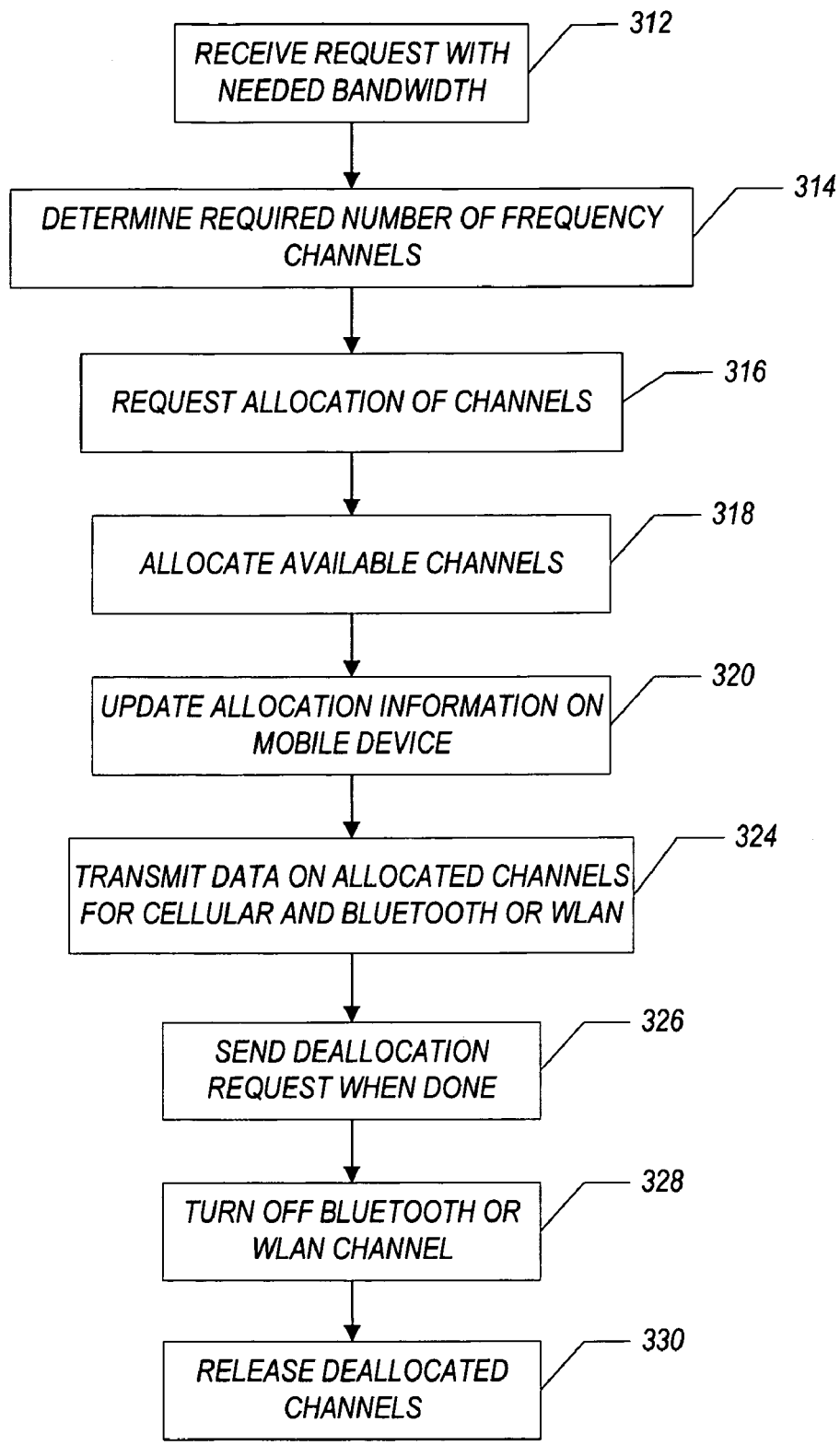
FIG. 2B shows an exemplary second process to bond several cellular channels and WLAN channels together to further increase transmission speed for the system of FIG. 2A.

FIG. 2B shows an exemplary second process 240 to bond cellular channels and Bluetooth or WLAN channels together to further increase transmission speed for the system of FIG. 2A. The process receives a request to communicate one or more files with a data transmission size (step 312). Based on the transmission size and known cellular and Bluetooth or WLAN channel bandwidth, the process computes the number of frequency channels that are needed (step 314). Next, the process requests an allocation of cellular frequency channels from a mobile station to a base station (step 316). In response, the base station looks up available (open) frequency channels in its memory storage and allocates available frequency channels in response to the request from the mobile station (step 318). Information on the allocated channels is sent to the mobile station to set up its transceiver to capture data on all allocated channels (step 320). Once the mobile station sends an acknowledgement that it has set up its RF circuitry to receive data over a plurality of frequency channels, the base station can transmit data over the plurality of frequency channels and the Bluetooth or WLAN channel (step 324). In this maimer, the allocated frequency channels are bonded together to communicate data with high bandwidth using a plurality of long-range and short-range wireless channels. Upon conclusion of data transmission, the mobile station sends a deallocation request to the base station (step 326), and turns off the Bluetooth or WLAN channel (step 328). The base station in turn releases the deallocated channels for other transmissions (step 330).

Figure 3:
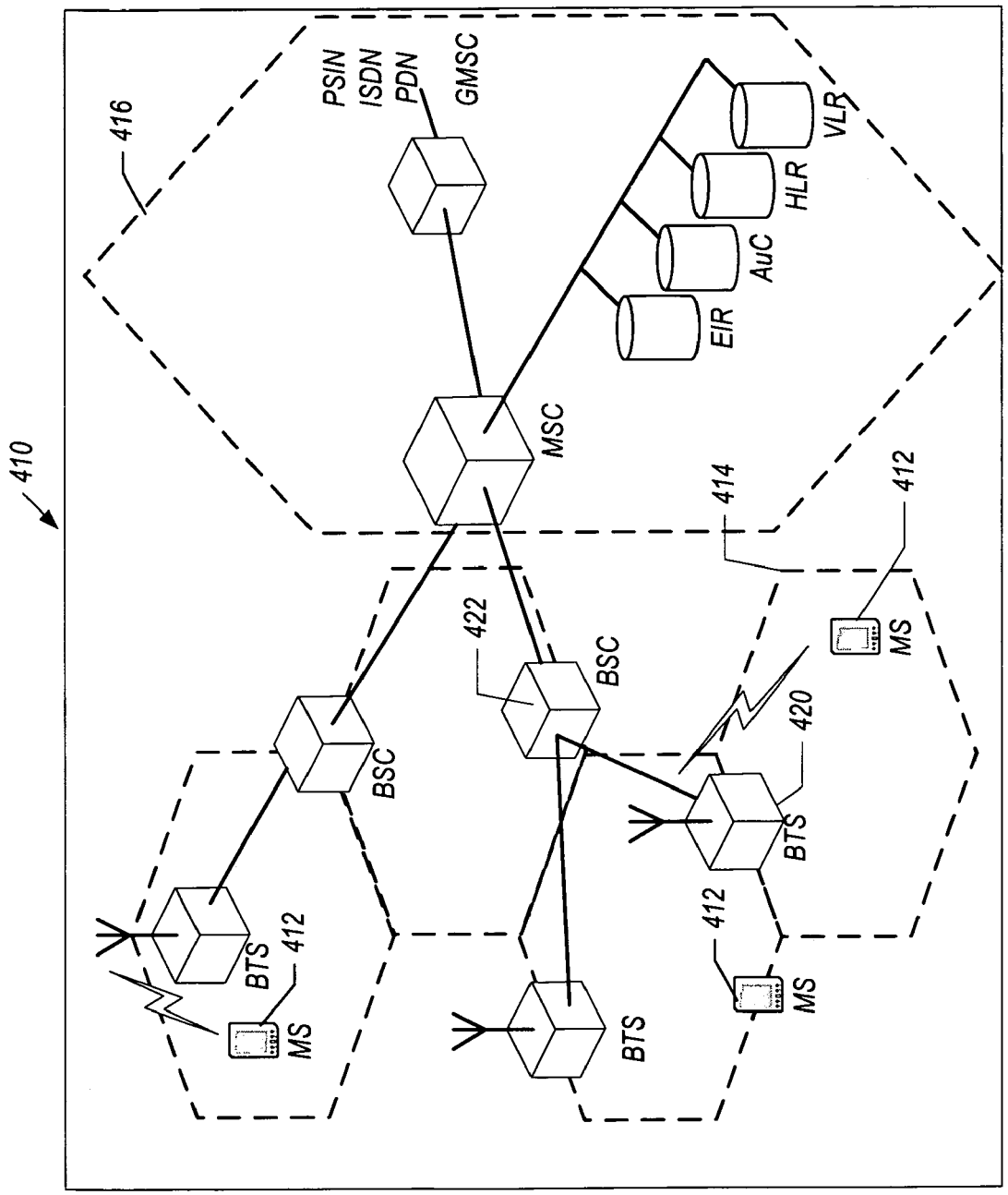
FIG. 3 is a block diagram of a wireless communications system.

FIG. 3 shows a cellular switching system 410. The system 410 has one or more Mobile Stations (MS) 412 that can transmit and receive data on-demand using a plurality of channels bonded together. The system 410 also has a Base Station Subsystem (BSS) 414, a Network and Switching Subsystem (NSS) 416, and an Operation and Support Subsystem (OSS), not shown. The BSS 414 connects the MS 412 and the NSS and is in charge of the transmission and reception. The BSS 414 includes a Base Transceiver Station (BTS) or Base Station 420 and a Base Station Controller (BSC) 422.

The BTS 420 corresponds to the transceivers and antennas used in each cell of the network. A BTS 420 is usually placed in the center of a cell. Its transmitting power defines the size of a cell. Each BTS 420 has between one and sixteen transceivers depending on the density of users in the cell. The BSC 422 controls a group of BTS 420 and manages their radio resources. A BSC 422 is principally in charge of handovers, frequency hopping, exchange functions and control of the radio frequency power levels of the BTSs 420. The NSS 416's main role is to manage the communications between the mobile users and other users, such as mobile users, ISDN users, fixed telephony users, among others. It also includes data bases needed in order to store information about the subscribers and to manage their mobility. The NSS includes a Mobile services Switching Center (MSC) that MSC performs the switching functions of the network. It also provides connection to other networks. The NSS also includes a Gateway Mobile services Switching Center (GMSC) that is the interface between the mobile cellular network and the PSTN. It is in charge of routing calls from the fixed network towards a GSM user. The NSS also includes a Home Location Register (HLR) which is a database that stores information of the subscribers belonging to the covering area of a MSC. It also stores the current location of these subscribers and the services to which they have access. The location of the subscriber corresponds to the SS7 address of the Visitor Location Register (VLR) associated to the terminal. The NSS also includes a Visitor Location Register (VLR). The VLR contains information from a subscriber's HLR necessary in order to provide the subscribed services to visiting users. When a subscriber enters the covering area of a new MSC, the VLR associated to this MSC will request information about the new subscriber to its corresponding HLR. The VLR will then have enough information in order to assure the subscribed services without needing to ask the HLR each time a communication is established. The NSS also includes an Authentication Center (AuC) that provides the parameters needed for authentication and encryption functions. These parameters help to verify the user's identity. The NSS includes an Equipment Identity Register (EIR), which is also used for security purposes. It is a register containing information about the mobile equipments. More particularly, it contains a list of all valid terminals. A terminal is identified by its International Mobile Equipment Identity (IMEI). The EIR allows then to forbid calls from stolen or unauthorized terminals (e.g., a terminal which does not respect the specifications concerning the output RF power). The NSS also communicates with a GSM Interworking Unit (GIWU), which corresponds to an interface to various networks for data communications. During these communications, the transmission of speech and data can be alternated. The OSS is connected to the different components of the NSS and to the BSC, in order to control and monitor the GSM system. It is also in charge of controlling the traffic load of the BSS.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. For example, although exemplary embodiments using Bluetooth, WLAN, GSM, GPRS, and EDGE have been discussed, the invention is applicable to other forms of data transmission, include radio-based and optical-based transmission techniques.

The invention claimed is:

1. A method comprising:
   a mobile station receiving an allocation of at least two cellular frequency channels;
   the mobile station aggregating available wireless channels by bonding together the at least two cellular frequency channels and a short-range radio channel to increase transmission bandwidth; and
   the mobile station communicating a set of data between the mobile station and a base station using the bonded at least two cellular frequency channels and the short-range radio channel concurrently.

2. The method of claim 1, further comprising dynamically bonding the short-range radio channel with the at least two cellular frequency channels based on a current traffic load.

3. The method of claim 1, further comprising dynamically bonding the short-range radio channel with the at least two cellular frequency channels based on priority of service.

4. The method of claim 3, wherein the data comprises video information.

5. The method of claim 1, further comprising receiving from the mobile station a request to increase the transmission bandwidth.

6. The method of claim 5, further comprising the mobile station determining a number of the cellular frequency channels to request based on the requested transmission bandwidth.

7. The method of claim 1, further comprising deallocating the at least two cellular frequency channels after communicating the data.

8. The method of claim 1, further comprising the mobile station communicating data and voice information simultaneously over the bonded cellular frequency and short-range radio channels.

9. An apparatus comprising:
   a processor;
   a first transceiver coupled to the processor and configured to communicate with a base station over cellular frequency channels;
   a second transceiver coupled to the processor and configured to communicate with the base station over a short-range radio channel; and
   a circuit configured to aggregate by bonding together a plurality of the cellular frequency channels and the short-range radio channel to increase transmission capacity;
   wherein the first and second transceivers are further configured to communicate a set of data to the base station using the aggregated plurality of cellular frequency channels and the short-range radio channel concurrently.

10. The apparatus of claim 9, wherein the first and second transceivers are configured to communicate multimedia files via the aggregated channels.

11. The apparatus of claim 9, wherein the apparatus comprises a mobile station.

12. The apparatus of claim 9, wherein the circuit is configured to aggregate the channels based upon demand.

13. The apparatus of claim 9, wherein the processor comprises an integrated circuit having a reconfigurable processor core that includes a plurality of digital signal processors (DSPs).

14. The apparatus of claim 13, wherein the reconfigurable processor core includes one or more reduced instruction set computer (RISC) processors.

15. The apparatus of claim 13, wherein the circuit comprises a router coupled to the reconfigurable processor core.

16. The apparatus of claim 15, wherein the router is configured to aggregate the plurality of the cellular frequency channels and the short-range wireless channel.

17. A mobile station comprising:
   a processor;
   a long-range transceiver coupled to the processor and configured to communicate with a base station over cellular frequency channels;
   a short-range transceiver coupled to the processor and configured to communicate with the base station over a short-range radio channel;
   means for aggregating wireless channels including bonding together a plurality of the cellular frequency channels and the short-range radio channel to increase data communication bandwidth between the mobile station and the base station; and
   means for transmitting a set of data to the base station using the bonded short-range radio channel and the plurality of cellular frequency channels concurrently.

18. The mobile station of claim 17, wherein the processor comprises a reconfigurable processor core including a plurality of digital signal processors (DSPs).

19. The mobile station of claim 18, wherein the reconfigurable processor core includes one or more reduced instruction set computer (RISC) processors.

20. The mobile station of claim 18, wherein the means for bonding comprises a router coupled to the reconfigurable processor core.

* * * * *